Figure 1:
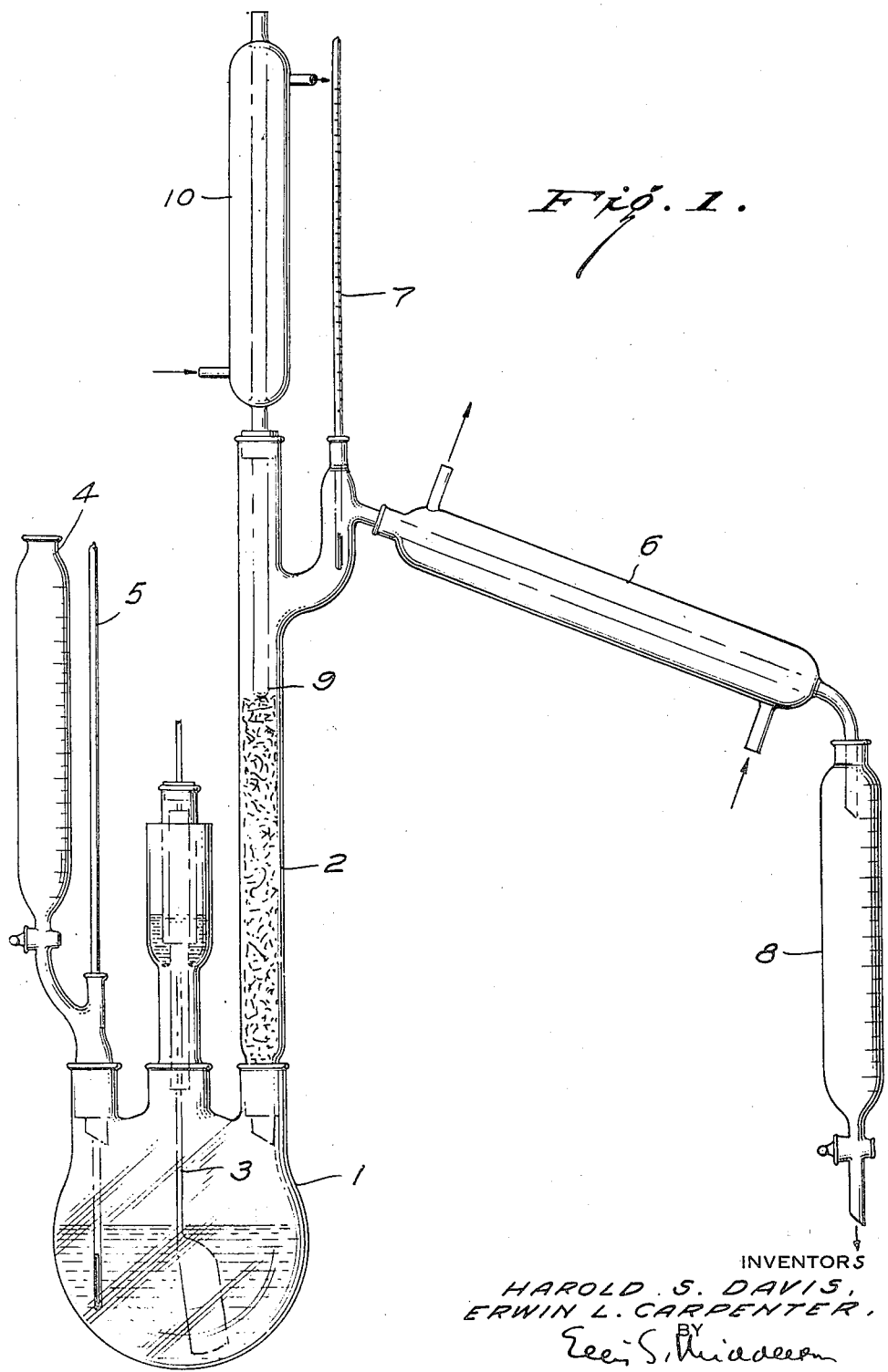

March 14, 1950 H. S. DAVIS ET AL 2,500,403
PRODUCTION OF OLEFINIC NITRILES
Original Filed Sept. 19, 1939 2 Sheets-Sheet 1

INVENTORS
HAROLD S. DAVIS,
ERWIN L. CARPENTER,
BY
ATTORNEY

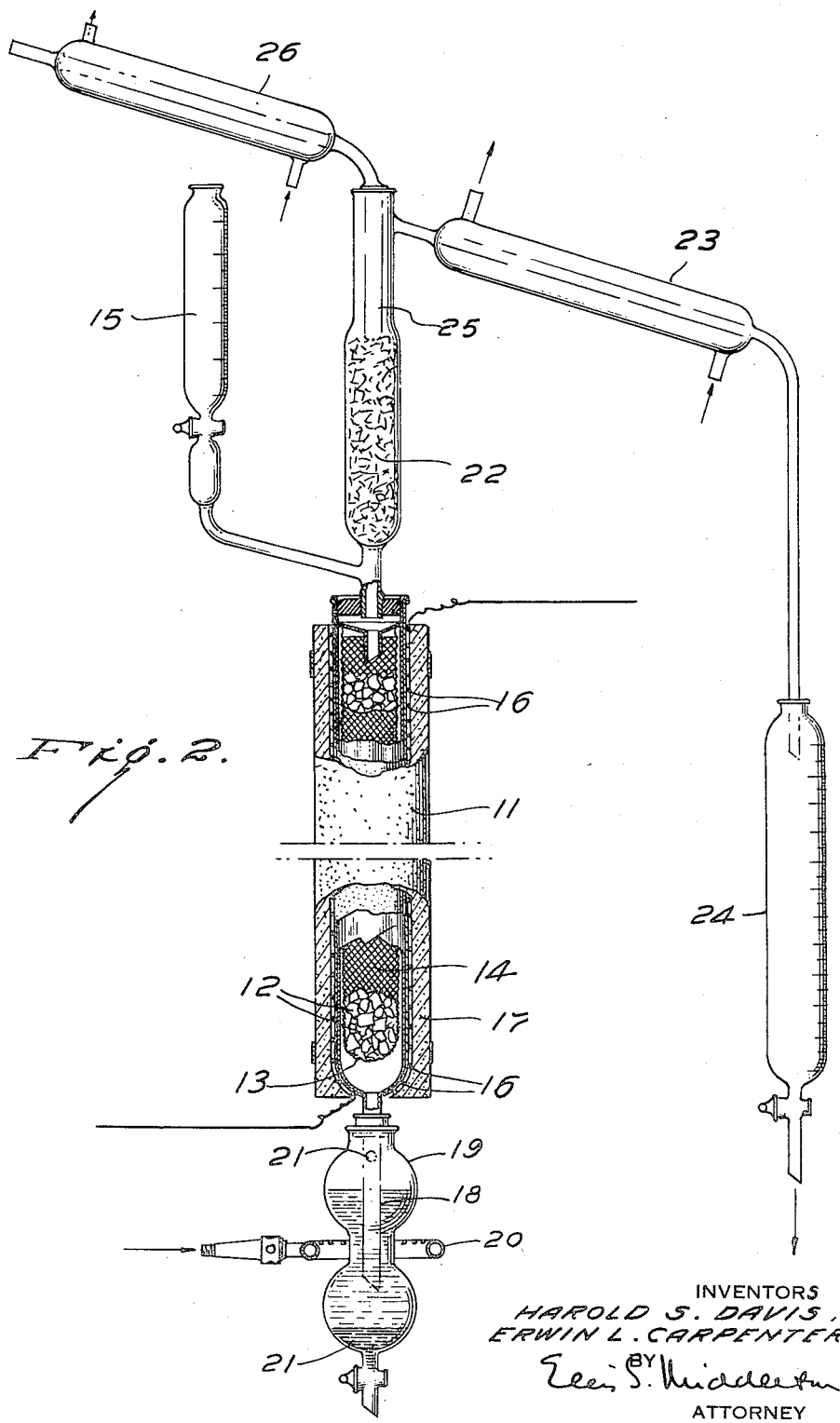

Patented Mar. 14, 1950

2,500,403

UNITED STATES PATENT OFFICE 2,500,403

PRODUCTION OF OLEFINIC NITRILES

Harold S. Davis, Greenwich, and Erwin L. Carpenter, Riverside, Conn., assignors to American Cyanamid Company, New York, N. Y., a corporation of Maine Continuation of application Serial No. 295,618, filed September 19, 1939. This application filed September 1, 1945, Serial No. 613,990. In Canada July 23, 1940

14 Claims. (Cl. 260—465.9)

The present invention relates to the production of olefinic nitriles, that is those nitriles which may be hydrolyzed to olefinic acids.

It is known that the nitrile of acrylic acid may be obtained by heating ethylene cyanohydrin in contact with such materials as acid sulfates, zinc chloride, silicic acid, metallic tin and tin compounds. Although these substances definitely catalyze the reaction, the rate of dehydration is relatively slow. Consequently, the time required in producing a quantity of the nitrile is not conducive to commercial operation.

The principal object of this invention is to devise a method wherein olefinic nitriles may be readily and cheaply obtained. A further object resides in a method for the production of olefinic nitriles requiring only simple apparatus with high efficiencies.

The applicants have found that olefinic nitriles may be readily obtained by heating the corresponding alkylene cyanohydrin in the presence of a sufficient amount of a catalyst comprising an inorganic compound having an alkaline reaction.

The reaction using ethylene cyanohydrin as a typical starting material may be written as follows:

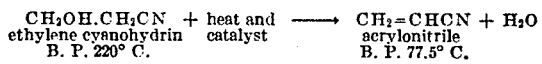

The compounds which have been found particularly suitable as catalysts in the dehydration reaction are calcium oxide, calcium hydroxide, magnesium oxide, sodium carbonate, potassium carbonate, sodium borate and trisodium phosphate.

The dehydration reaction may be carried out in conjunction with an inert organic compound having a boiling point within the range of 130–260° C., such as petroleum fractions, naphthalene, diphenyl ether, etc., which lowers the tendency of the cyanohydrin to form decomposition and/or polymerization products, and aids either as a washing or solvent medium in the removal of these products from the surface of the catalyst. The inert liquid material further assists in removing these resinous by-products from parts of the dehydration apparatus where they have a tendency to accumulate. It also assists in a more uniform transfer of heat, extends the life of the catalyst, improves the yield of nitrile per unit of cyanohydrin added, and acts as a carrier in removing the nitrile and water from the reaction mixture.

Fig. 1 of the accompanying drawings illustrates a "pot still" method for the production of olefinic nitriles. A quantity of alkylene cyanohydrin and a catalyst in suitable proportions is placed in the three-neck reaction vessel 1, provided with a reflux condenser 2, stirrer 3, dropping funnel 4, and thermometer 5. The mixture is thoroughly stirred and heated to a temperature sufficient to produce optimum dehydration. The reflux condenser 2 containing pieces of broken glass is maintained at such a temperature that the unchanged cyanohydrin flows back into the reaction vessel 1, while the vapors of nitrile and water formed in the dehydration reaction pass upward and into the condenser 6. The boiling point of the distillate is recorded from thermometer 7. The liquid nitrile and water are collected in separate layers in the receiving vessel 8. A cooling head 9 containing a liquid boiling at a temperature approximately equal to the boiling point of the nitrile obtained in the dehydration reaction is inserted at the top of the reflux column 2 to condense such vapors of cyanohydrin as may reach that point. The cooling head 9 is provided with a cooling jacket 10. The process may be made continuous by introducing the cyanohydrin into the reaction vessel 1 by means of the dropping funnel 4 at a rate sufficient to maintain the course of the reaction.

Table I

[Yields of acrylonitrile from the dehydration of ethylene cyanohydrin. "Pot still" method using 52 parts by weight of ethylene cyanohydrin.]

| Example | Catalyst | | Temp. in Reaction Vessel, ° C. | Inert Liquid Carrier | | Yield, Per cent of Theory |
|---|---|---|---|---|---|---|
| | Name | Parts by Wt. | | Name | Parts by Wt. | |
| 1 | CaO | 22.7 | 155–180 | None | | 65 |
| 2 | CaO | 26.7 | 165–190 | ---do--- | | 62 |
| 3 | MgO | 10.3 | 220 | ---do--- | | 72 |
| 4 | CaO | 21.0 | 185–200 | Petroleum Fraction 185–215° C. | 100 | 79 |
| 5 | CaO | 69.0 | 185–200 | ---do--- | 100 | 84 |
| 6 | Ca(OH)₂ | 20.0 | 200–210 | ---do--- | 54 | 75 |
| 7 | Na₂CO₃ | 20.0 | 205–215 | ---do--- | 51 | 79 |

Fig. 2 illustrates a "reflux tower" method for the continuous production of olefinic nitriles in which the dehydration reaction is carried out in the distilling column 11 containing the catalyst 12 supported on an inert material 13 such as chips of brick, pumice, coke, porcelain and the like and preferably held in place by a cylindrical metal screen basket 14. The alkylene cyanohydrin which is added through the dropping funnel 15 enters the top of the column 11 and passes down over the catalyst. An electric heating element 16 provided with a suitable insulating jacket 17 heats the column 11 to a temperature sufficient to promote optimum dehydration. A high-boiling inert carrier 18, such as a petroleum fraction-boiling-point range of 185–215° C., naphthalene or diphenyl ether, is heated to boiling temperature in vessel 19 by means of burner 20. The inert carrier vapors enter opening 21, reflux in the column 11 and continually remove the polymer from the reaction zone. In this manner the polymer is washed downward from the column 11 and collected in the vessel 19. Accordingly, the surface of the catalyst is kept comparatively clean and interaction between the polymer and fresh cyanohydrin is minimized. The inert refluxing liquid supplies sufficient heat to remove the vapors of nitrile and water as fast as they are formed and thus prevents overheating of the cyanohydrin.

A fractionating tower 22 at the top of the distilling column refluxes back the inert carrier and unreacted cyanohydrin. The nitrile and water pass over to the condenser 23 and after condensation separate into two layers in the receiving vessel 24. A cooling head 25 containing a liquid boiling at a temperature approximately equal to the boiling point of the nitrile obtained in the dehydration reaction is inserted at the top of the fractionating tower to condense any vapors of the inert carrier or cyanohydrin as may reach that point. The cooling head 25 is provided with a cooling jacket 26.

The "reflux tower" method may be operated without the use of the inert liquid carrier. In this manner, the polymer which is molten at the reflux tower operating temperature will flow downward from the reaction zone and be collected in the vessel 19 attached to the base of the distilling column 11. Provision is made at the base of the still for the removal of either the polymer 27 or a mixture of the polymer and inert carrier.

A catalyst which has become inactive due possibly to contact with the polymer may be regenerated by passing hot water and steam through the distilling column, thereby removing the polymer which is water soluble.

and 20 grams of anhydrous sodium borate was stirred and heated to a temperature of 190–210° C. in the reaction vessel of Fig. 1. As acrylonitrile and water were evolved, more ethylene cyanohydrin was added through the dropping funnel to maintain between 150–250 grams of the cyanohydrin in the reaction vessel. At the end of four hours, the addition of ethylene cyanohydrin was stopped, at which point a total of 1172 grams was added. The run was continued for another hour to complete the dehydration of the remaining cyanohydrin. A brown residue of polymer and sodium borate remained which was fluid when hot, and water soluble. The yield of acrylonitrile was 76%. The product was a colorless, mobile liquid having a boiling point of 77.3–77.5° C. at a pressure of 760 mm.

*Example 18*

A charge of 443 grams of propylene cyanohydrin (β-hydroxybutyronitrile) and 30 grams of anhydrous sodium borate was stirred and heated at a temperature of 180–200° C. in the reaction vessel of Fig. 1. The dehydration reaction was completed in approximately five hours. The distillate separated into a water layer and a crotononitrile (β-methylacrylonitrile) layer in the proportion of about one part of water to four parts of nitrile by volume. After removal of the water layer, the nitrile was subjected to fractional distillation and found to be a mixture of cis- and trans- isomers of crotonic nitrile. About 65–70% of the product was cis-crotonic nitrile, a water-white liquid having a boiling point of 107.5–108.5° C. at 760 mm. pressure. The trans-crotonic nitrile was also a water-white liquid having a boiling point of 119.0–120.5° C. at 760 mm. pressure.

*Example 19*

A charge of 384 grams of propylene cyanohydrin (β-hydroxybutyronitrile) and 46 grams of trisodium phosphate was stirred and heated at a temperature of 165–190° C. in the reaction vessel of Fig. 1. The dehydration reaction was complete in approximately four hours. The distillate was separated and the crotonic nitrile distilled as described in Example 18. The yield of crotonic nitrile (β-methylacrylonitrile) was 76.5% of theory.

*Example 20*

A charge of 100 grams of isobutylene cyanohydrin (β-hydroxyisovaleronitrile) and 10 grams of anhydrous sodium borate was stirred and heated at a temperature of approximately 165° C., in the reaction vessel of Fig. 1. The material showed no coloration during the dehydration reaction, and no evidence of polymer was found at the end

*Table II*

[Continuous dehydration of ethylene cyanohydrin by "reflux tower" method]

| Example | Grams of Ethylene Cyanohydrin Added | Rate of Addition of Ethylene Cyanohydrin, c.c./min. | Inert Liquid Carrier | Catalyst | Per Cent Yield of Acrylonitrile |
|---|---|---|---|---|---|
| 8 | 360 | 1.0 | Diphenyl ether | Ca(OH)$_2$ on pumice | 75 |
| 9 | 2,775 | 1.6–1.9 | do | do | 72 |
| 10 | 1,420 | 1.7–1.9 | Naphthalene | do | 85 |
| 11 | 1,772 | 2.6 | do | Ca(OH)$_2$ on coke | 84 |
| 12 | 1,021 | 2.8 | do | do | 86 |
| 13 | 899 | 2.1 | do | do | 81 |
| 14 | 880 | 2.4–2.5 | do | Ca(OH)$_2$ on brick | 37 |
| 15 | 1,374 | 4.8–4.9 | do | Ca(OH)$_2$ on porcelain | 80 |
| 16 | 1,956 | 4.0 | do | Na$_2$CO$_3$ on brick | 84 |

*Example 17*

A charge of 250 grams of ethylene cyanohydrin of the run. The distillate was subjected to fractional distillation. β,β-dimethylacrylonitrile was obtained as a water-white liquid having a boiling point of 140–142° C. at 766 mm. pressure.

Similarly other members of the olefinic nitrile series may be obtained by using as a starting material the corresponding alkylene cyanohydrin and heating the same with a dehydrating catalyst of the class herein described.

The products thus obtained readily stratify into two layers, the lower of which is predominantly water containing some nitrile, while the upper layer is predominantly nitrile containing some water.

The water may be removed from the upper layer by distillation due to the fact that these nitriles can form azeotropic mixtures with water. Upon such distillation all the water comes over with the first portion of the distillate leaving anhydrous nitrile in the distillation vessel.

The nitrile may be removed from the lower layer by extraction with such nitrile solvents as toluene or xylene followed by fractionation of the extract.

While the invention has been described with particular reference to specific embodiments, it is to be understood that it is not to be limited thereto but is to be construed broadly and restricted solely by the scope of the appended claims.

This application is a continuation of applicants' copending application Serial No. 295,618, filed September 19, 1939, now abandoned.

We claim:

1. A method of making an olefinic nitrile which includes the steps of heating the corresponding alkylene cyanohydrin in the presence of a sufficient amount of a catalyst comprising an alkali forming metal compound having an alkaline reaction so as to cause dehydration of the alkylene cyanohydrin.

2. The method of claim 1 in which the alkylene cyanohydrin and catalyst are heated together in conjunction with an inert organic carrier having a boiling point within the range of 130–260° C.

3. A method of making acrylonitrile which includes the steps of heating ethylene cyanohydrin in the presence of a sufficient amount of a catalyst comprising an alkali forming metal compound having an alkaline reaction so as to cause dehydration of the ethylene cyanohydrin.

4. A method of making $\beta$-methylacrylonitrile which includes the steps of heating $\beta$-hydroxybutyronitrile in the presence of a sufficient amount of a catalyst comprising an alkali-forming metal compound having an alkaline reaction so as to cause dehydration of the $\beta$-hydroxybutyronitrile.

5. A method of making $\beta,\beta$-dimethylacrylonitrile which includes the steps of heating $\beta$-hydroxyisovaleronitrile in the presence of a sufficient amount of a catalyst comprising an alkali-forming metal compound having an alkaline reaction so as to cause dehydration of the $\beta$-hydroxyisovaleronitrile.

6. A method of making acrylonitrile which includes the steps of heating ethylene cyanohydrin in an inert organic carrier having a boiling point within the range of 130 to 260° C., in the presence of a sufficient amount of a catalyst comprising an alkali forming metal compound having an alkaline reaction so as to cause dehydration of the ethylene cyanohydrin.

7. A method of making $\beta$-methacrylic nitrile which includes the steps of heating $\beta$-hydroxybutyronitrile in an inert organic carrier having a boiling point within the range of 130 to 260° C., in the presence of a sufficient amount of a catalyst comprising an alkali forming metal compound having an alkaline reaction so as to cause dehydration of the $\beta$-hydroxybutyronitrile.

8. A method of making $\beta,\beta$-dimethylacrylonitrile which includes the steps of heating $\beta$-hydroxyisovaleronitrile in an inert organic carrier having a boiling point within the range of 130 to 260° C. in the presence of a sufficient amount of a catalyst comprising an alkali forming metal compound having an alkaline reaction so as to cause dehydration of the $\beta$-hydroxyisovaleronitrile.

9. A method of making acrylonitrile which includes the steps of heating ethylene cyanohydrin in a naphthalene carrier in the presence of sodium borate as a catalyst.

10. The method of making $\beta$-methacrylic nitrile which includes the steps of heating $\beta$-hydroxybutyronitrile in a naphthalene carrier in the presence of sodium borate as a catalyst.

11. A method of making $\beta,\beta$-dimethylacrylonitrile which includes the steps of heating $\beta$-hydroxyisovaleronitrile in a naphthalene carrier in the presence of sodium borate as a catalyst.

12. A method of making acrylonitrile which includes the steps of heating ethylene cyanohydrin in the presence of a sufficient amount of sodium borate so as to cause dehydration of the ethylene cyanohydrin.

13. A method of making acrylonitrile which includes the steps of heating ethylene cyanohydrin within the range of 130 to 260° C. in the presence of a sufficient amount of sodium borate so as to cause dehydration of the ethylene cyanohydrin.

14. A method of making an olefinic nitrile which includes the steps of heating the corresponding alkylene cyanohydrin in the presence of a sufficient amount of sodium borate so as to cause dehydration of the alkylene cyanohydrin.

HAROLD S. DAVIS.
ERWIN L. CARPENTER.

REFERENCES CITED

The following references are of record in the file of this patent:

UNITED STATES PATENTS

| Number | Name | Date |
|---|---|---|
| 1,891,055 | Reppe et al. | Dec. 13, 1932 |
| 2,356,247 | Kirk et al. | Aug. 22, 1944 |
| 2,364,422 | Brooks | Dec. 5, 1944 |
| 2,374,052 | Spence et al. | Apr. 17, 1945 |
| 2,392,303 | Balcar | Jan. 8, 1946 |

FOREIGN PATENTS

| Number | Country | Date |
|---|---|---|
| 496,372 | Germany | Apr. 24, 1930 |
| 416,007 | Great Britain | Sept. 3, 1934 |

OTHER REFERENCES

Erlenmeyer, Liebig's Annalen, vol. 191, pp. 269–285 (1878).

Van der Burg, Rec. Trav. Chim., vol 41, pg. 23 (1922).